Patented May 15, 1945

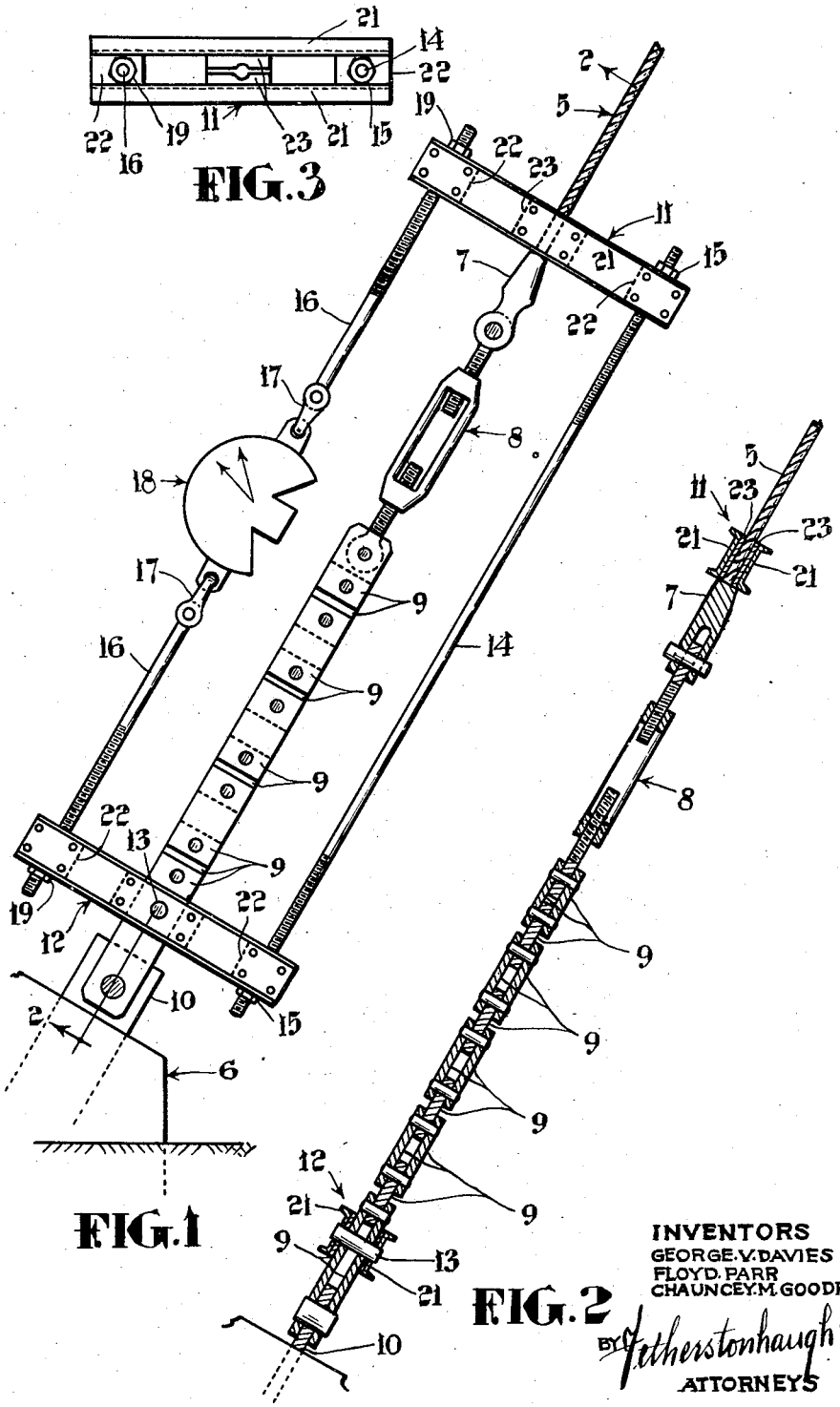

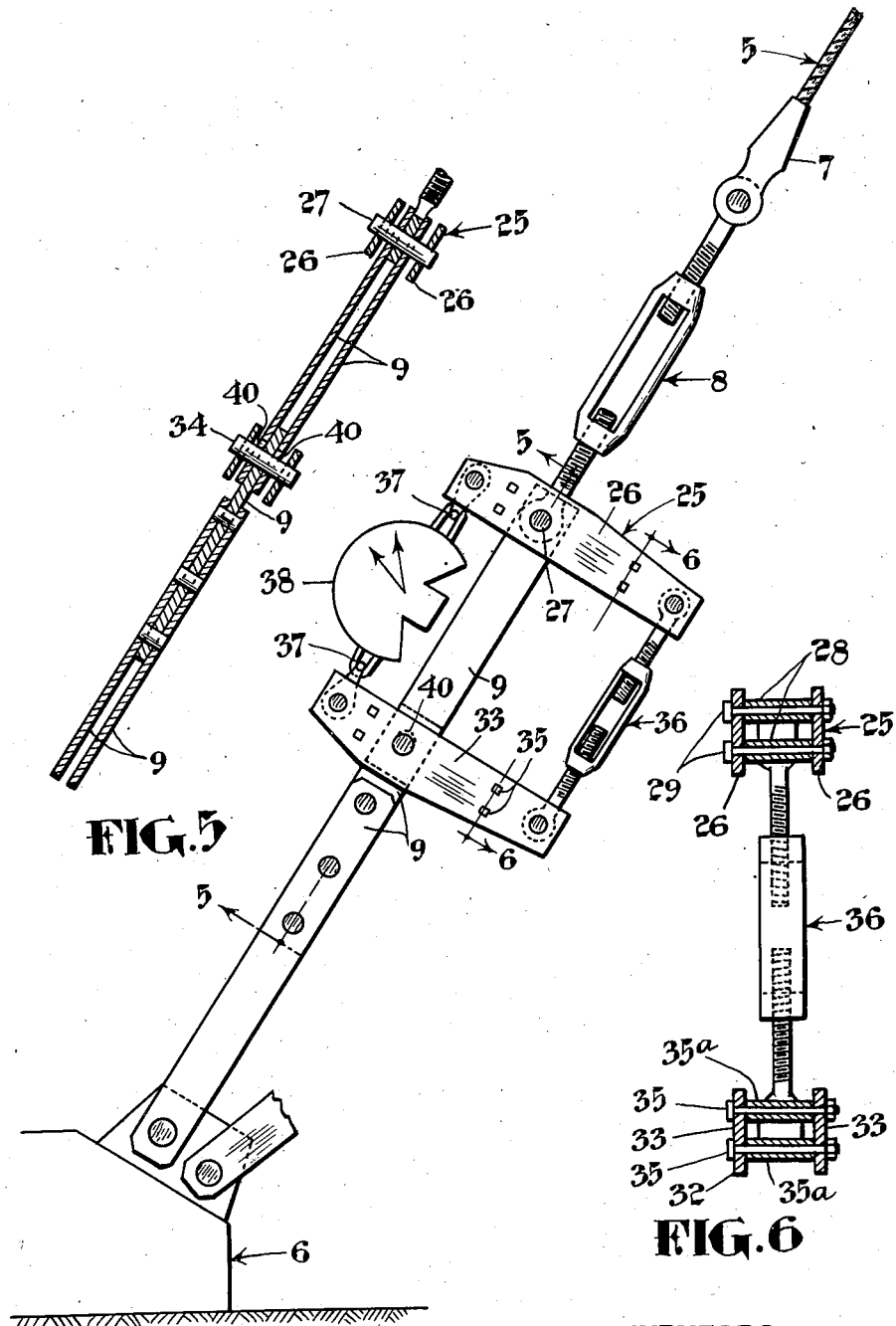

2,376,037

UNITED STATES PATENT OFFICE 2,376,037

APPARATUS FOR MEASURING AND ADJUSTING TENSION IN GUY LINES

George V. Davies, Floyd Parr, and Chauncey M. Goodrich, Windsor, Ontario, Canada, assignors to The Canadian Bridge Company Limited, Walkerville, Ontario, Canada Application April 23, 1943, Serial No. 484,268

7 Claims. (Cl. 73—143)

This invention relates to apparatus for measuring and, when necessary, adjusting the tension in the guy lines of a vertical mast or tower such, for example, as a radio antenna tower.

For one reason or another previously proposed devices intended to accomplish the purpose of the present invention have not proven sufficiently satisfactory for widespread adoption. For example, it has previously been proposed to provide punch marks at two suitably separated points in the length of a guy line so that when the guy line is properly tensioned the distance between the punch marks will be increased to correspond with the distance between two check marks on an unstressed comparator rod. This scheme does not readily lend itself to accurate tensioning of the guy line even when used by highly skilled technicians. It is also open to the objection that it makes no provision for large adjustments in the length of the guy lines and is unsuitable for use in those cases where considerable shortening of guy lines must be resorted to in order to restore the initial tension after the guy lines or cables have been stretched in service.

Other previously proposed guy line tension measuring and adjusting devices require that such devices be permanently included, in whole or in part, in the guy line itself. Such devices complicate the installation of the guy line with which they are associated and constitute an expensive and inconvenient means for determining and adjusting the tension.

The present invention provides a simple type of portable tension measuring apparatus which may easily be applied to any conventional guy line and which, when so applied, may be used by a comparatively unskilled workman to measure and adjust the tension in the guy line with the requisite degree of accuracy.

More particularly, the present invention provides a tension measuring device comprising two yokes adapted to be detachably fastened to a guy line system at suitably separated points, said yokes being coupled together by connections which are adjustable to shorten the initial distance between the yokes so that the tension in the portion of the guy line system between the yokes is taken over by the measuring device and is measured or indicated by a dynamometer included in one of said adjustable connections. The measuring device may be connected between two points of the cable element of the guy line system but it is preferred that one yoke be connected to the cable element and the other to one of the anchoring links by which the cable element is anchored to a fixed abutment. In either case provision is made so that the tension in the portion of the guy line system lying between the yokes is released when the yokes are adjusted to shorten the distance therebetween. When it is desired to adjust, as well as measure, the tension in the guy line, this may be accomplished by providing suitable tensioning means in the guy line system between the points of attachment of the yokes or elsewhere in said system.

When the measuring device provided in accordance with this invention is connected between the cable element and an anchoring link of the guy line system it enables the guy line to be lengthened or shortened by substituting longer or shorter links in that portion of the system which is relaxed and relieved of tension when the yokes of the measuring device are adjusted to shorten the distance therebetween.

Proceeding now to a more detailed description of the preferred embodiments of this invention reference will be had to the accompanying drawings, in which—

Fig. 1 is a side elevational view showing how our tension measuring apparatus is associated with a guy line system provided with take-up means located between the points of attachment of the yokes.

Fig. 2 is a sectional view taken substantially along the line 2—2 of Fig. 1.

Fig. 3 is a top plan view of the upper yoke shown in Fig. 1,

Fig. 4 is a view similar to Fig. 1 but showing a modification.

Fig. 5 is a sectional view taken substantially along the section line 5—5 of Fig. 4.

Fig. 6 is a sectional view taken substantially along the line 6—6 of Fig. 4.

Referring to the assembly shown in Figs. 1 to 3 inclusive, 5 designates a guy line cable having its lower end anchored to a suitable abutment 6 by anchorage means comprising cable socket 7, turnbuckle 8, links 9, and anchor bar 10, the latter being embedded in said abutment.

A yoke 11 is detachably secured to cable 5 in strain transmitting engagement with the upper end of cable socket 7. A second yoke 12 is detachably secured to the lowermost link 9 by a pin 13 passing through an extra hole provided in said link. Corresponding ends of the two yokes are adjustably connected together by a threaded rod 14 equipped with yoke-engaging adjusting nuts 15. The two remaining ends of the yokes are also connected by an adjustable connection including two threaded rods 16 having their inner ends connected, by shackles 17 or other suitable means, to an interposed dynamometer 18 or other stress measuring device, the outer ends of rods 16 being equipped with yoke-engaging adjusting nuts 19.

After the yokes 11 and 12 have been secured in place on the guy line system, the nuts 15 and 19 are screwed up on the rods 14 and 16, thus decreasing the distance between the yokes so that the links 9 lying between the points of attachment of the yokes are relieved of tension and permitted to slacken, the tension being transferred to the yokes and their connections and being indicated by the dynamometer 18. If it is found that shortening of the guy line system is necessary to restore the initial tension this may be accomplished by appropriate adjustment of the turnbuckle 8. The length of the guy line system may also be adjusted by replacing one or more of the relaxed links 9 with shorter links.

Each of the yokes 11 and 12 is here shown as comprising two channel irons 21 separated, at their ends, by interposed filler blocks 22 which are detachably secured in place in any suitable manner, said filler blocks being apertured for the passage of the adjusting rods 14 and 16 therethrough and serving as abutments for the adjusting nuts 15 and 19. The channel members of the upper yoke 11 also carry cable engaging filler pieces 23 which are shaped to fit around the cable 5 in strain transmitting engagement with the upper end of the cable socket 7.

In the construction shown in Figs. 4 and 5 the points of attachment of the yokes are located between the turn-buckle 8 and the abutment 6. In this case the upper yoke 25 comprises side plates 26 which are fitted on opposite ends of a pin 27 connecting the lower eye bolt of turn-buckle 8 to the upper ends of the uppermost links 9, said plates 26 being suitably separated by interposed spacer sleeves 28 and being fastened together by bolts 29 passing through said sleeves. The lower yoke 32 also comprises side plates 33 mounted on the ends of a pin 34 which connects the lower ends of the uppermost links 9 to the upper end of the next lower link 9. The side plates of the lower yoke are fastened together in spaced relation by fastening bolts 35 and spacing sleeves 35a corresponding with the fastening bolts and spacing sleeves previously described. The right hand ends of the two yokes shown in Fig. 4 are adjustably connected together by an interposed turn-buckle connection 36, the remaining or left hand ends of said yokes being connected by shackles 37 to an interposed dynamometer 38 or other strain measuring instrument. The lower ends of the uppermost links 9 shown in Figs. 4 and 5 are provided with longitudinally extending slots 40 through which the connecting pin 34 passes. This permits the uppermost links 9 to slide downwardly relatively to said pin 34 and to be relieved of tension when the distance between the points of attachment of the yokes 25 and 32 is shortened by appropriate adjustment of the turn-buckle 36. In this way the tension is transferred from the uppermost links 9 to the measuring device and is indicated by the dynamometer 38. If it is found that the tension in the guide line system is greater or less than the desired tension this condition is remedied by appropriate adjustment of the turn-buckle 8.

In the arrangement shown in Figs. 1 to 3 inclusive, the yokes 11 and 12 are intermediately pivoted to the guy line system so that the lever arms between which the adjusting rod 14 is connected are of the same length as the lever arms between which the dynamometer 18 is connected. In this case there is a substantially equal division of the tension load between the two yoke connections.

In the arrangement shown in Figs. 4 and 5 the yokes 25 and 32 are pivotally secured to the guy line system so that the lever arms of the yokes between which the dynamometer 38 is connected are shorter than the lever arms between which the yoke adjusting turn-buckle 36 is connected. In this case a greater proportion of the tension load transferred to the yokes is taken by the dynamometer as compared with the arrangement shown in Figs. 1 to 3 inclusive. In practice the relative lengths of the lever arms of the two yokes may be varied so that the dynamometer will take any desired proportion of the tension load which is transferred to the yokes when the distance between the yokes is shortened by the adjusting means provided for this purpose.

Having thus fully described what we now conceive to be the preferred embodiments of this invention, it will be understood that various modifications may be resorted to within the scope and spirit of the appended claims.

Having thus described our invention, what we claim is:

1. Apparatus for measuring the tension in a guy line comprising a pair of yokes, means pivotally securing intermediate portions of said yokes to the guy line at separated points intermediate the ends of the guy line, a stress measuring instrument connected between corresponding ends of the yokes and a turn-buckle connected between the opposite ends of the yokes 2. Apparatus as set forth in claim 1 in which the central axis of each yoke is located at one side of the transverse centre of the yoke.

3. Apparatus for measuring the tension in a guy line comprising a pair of yokes, strain transmitting means pivotally securing intermediate portions of said yokes to the guy line at separated points intermediate the ends of the guy line, a stress measuring instrument, yoke adjusting means connecting said instrument to corresponding ends of said yokes and additional yoke adjusting means connected between the opposite ends of said yokes.

4. Apparatus for measuring the tension in a guy line comprising a pair of yokes, means pivotally securing intermediate portions of said yokes to the guy line at separated points intermediate the ends of the guy line, a stress measuring instrument, adjustable means connecting said instrument to corresponding ends of said yokes, a threaded rod extending through and projecting beyond the opposite ends of the yokes and yoke engaging adjusting nuts threaded onto the projecting ends of said rod.

5. A guy line tension measuring assembly comprising a tensioned guy line system including a slot and pin connection between adjacent elements of the system, a pair of yokes connected to the guy line system at separated points located intermediate the ends of said system and at opposite sides of said slot and pin connection, a stress measuring instrument connected between corresponding ends of said yoke and yoke adjusting means connected between the opposite ends of said yokes and operable to adjust the yokes so as to decrease the distance between their points of attachment to said system, the tension in the portion of the guy line system lying between the points of attachment of the yokes being thereby transferred to the yokes and their connecting means and being indicated by said measuring instrument.

6. A guy line tension measuring and adjusting assembly comprising a tensioned guy line system including an adjusting device for adjusting the length of said system, a pair of yokes connected to said system at separated points located intermediate the ends of said system and at opposite sides of said adjusting device, a measuring instrument connected between corresponding ends of said yokes and yoke adjusting means connected between the opposite ends of said yokes.

7. A guy line tension measuring and adjusting assembly comprising a tensioned guy line assembly including a guy line cable and a series of links anchoring the lower end of the cable to a suitable point of anchorage, adjacent link elements of said series being connected together by a slot and pin connection, a pair of yokes connected to said system at separated points located between the ends of said system so that when the distance between the points of attachment of the yokes is shortened the link members connected by said slot and pin connection are permitted to move relatively to each other to slacken that part of the system which lies between the said points of attachment of the yokes, a measuring instrument connected between corresponding ends of said yokes and yoke adjusting means connected between the opposite ends of the yokes and operable to draw the last mentioned ends of the yokes toward each other to shorten the distance between the points of attachment of the yokes to the guy line system.

GEORGE V. DAVIES.
FLOYD PARR.
CHAUNCEY M. GOODRICH.